United States Patent [19]

Pruett

[11] Patent Number: 4,931,899
[45] Date of Patent: Jun. 5, 1990

[54] CERAMIC CASED CAPACITOR

[75] Inventor: Donald N. Pruett, Carson City, Nev.

[73] Assignee: Sierra Aerospace Technology, Inc., Carson City, Nev.

[21] Appl. No.: 297,179

[22] Filed: Jan. 17, 1989

[51] Int. Cl.[5] .................... H01G 1/02; H01G 7/00; H02G 15/08

[52] U.S. Cl. .................... 361/308; 361/321; 29/25.42

[58] Field of Search .................... 361/306, 308–310, 361/307, 320, 321; 29/25.42

[56] References Cited

U.S. PATENT DOCUMENTS

| | | | |
|---|---|---|---|
| 2,373,098 | 4/1945 | Brennan | 361/321 |
| 2,919,483 | 1/1960 | Gravley | 361/321 X |
| 2,972,180 | 2/1961 | Gulton et al. | 361/321 X |
| 3,235,939 | 2/1966 | Rodriguez et al. | 29/25.42 |
| 3,446,912 | 5/1969 | Diehl et al. | 361/308 X |
| 3,452,257 | 6/1969 | Belko | 361/308 |
| 3,456,313 | 7/1969 | Rodriguez et al. | 29/25.42 |
| 3,818,118 | 6/1974 | Bennett et al. | 361/308 X |

*Primary Examiner*—Donald A. Griffin
*Attorney, Agent, or Firm*—Kelly Bauersfeld & Lowry

[57] ABSTRACT

A ceramic cased capacitor and related method of construction are provided, wherein the capacitor is substantially impervious to moisture penetration and is adapted for attachment to conductive leads with superior lead pull strength. The capacitor comprises at least two conductive plates encased at a selected gap within a substantially monolithic casing of selected dielectric material such as a ceramic material. The plates each include a tab projecting beyond an adjacent margin of the other plate. Recessed seats are formed in the casing as by drilling to bridge at least partially into the tabs. Conductive lead ends are attached to the capacitor by soldering within the recessed seats, thereby securely anchoring the leads in a manner substantially impervious to moisture penetration. The thus-formed capacitor may be used in a wide range of electronic circuit applications without requiring a conventional encapsulating outer jacket or coating of insulating material. By virtue of omission of the encapsulating jacket, the capacitor can be used in high temperature environments, and/or in high voltage applications, without concern for jacket deterioration, deterioration in insulation resistance, or delamination of the jacket relative to the monolithic casing.

26 Claims, 2 Drawing Sheets

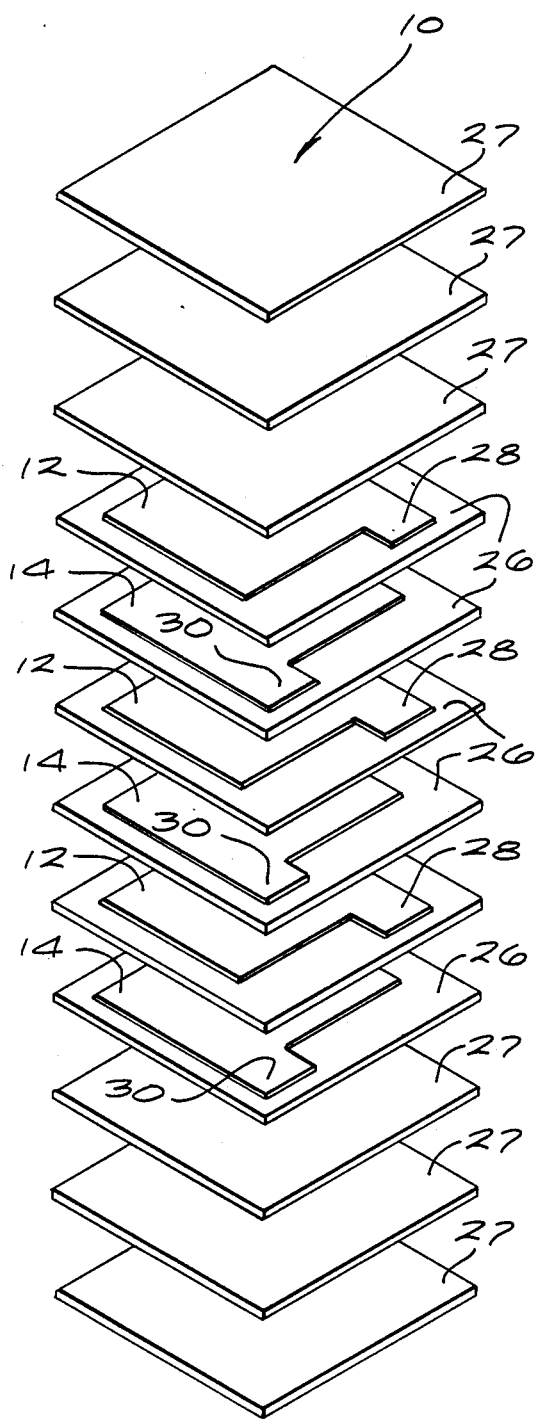
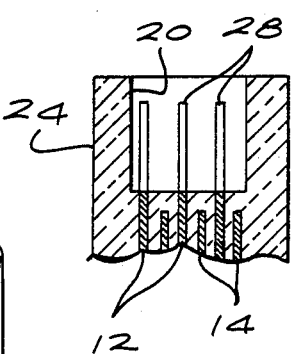
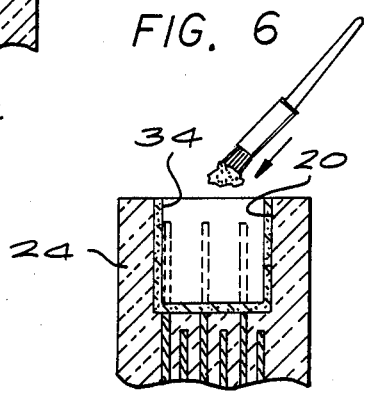
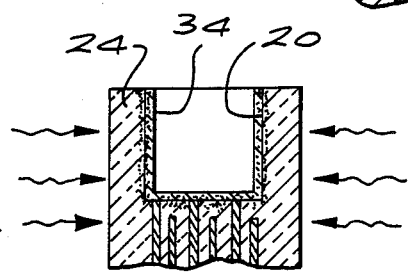
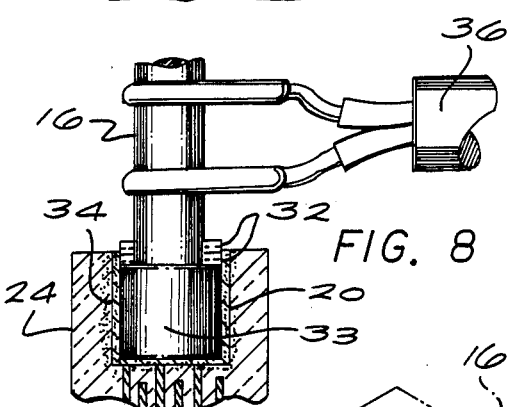
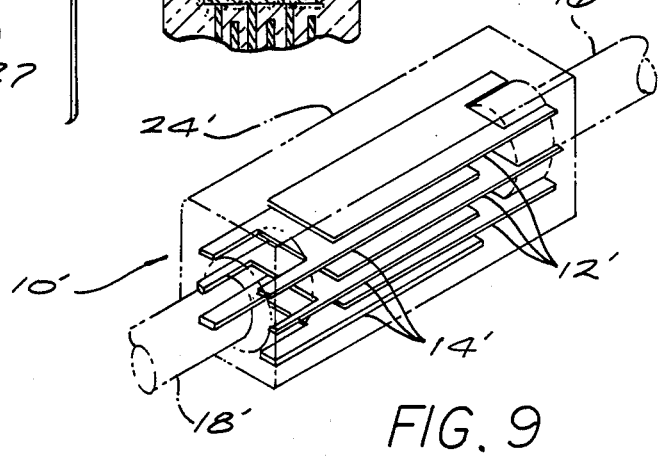

CERAMIC CASED CAPACITOR

BACKGROUND OF THE INVENTION

This invention relates generally to a novel ceramic cased capacitor and related methods of production. More particularly, this invention relates to a ceramic cased capacitor having a high temperature operating capability, together with a high lead pull strength and substantially improved resistance to moisture penetration to avoid moisture induced failures.

Ceramic dielectric capacitors in general are well known in the art for use in a wide range of electronic circuit applications, for example, for use as a charge storage device, a circuit coupling or decoupling device, a filtering device, etc. Such capacitors conventionally comprise at least two conductive plates encased in facing relation at a predetermined spacing or gap within a selected dielectric casing material, typically such as a ceramic based material formulated to have a selected dielectric constant. With this construction, the capacitor has a charge storing capacity which is a function of the overlapping or "active" plate surface areas, the thickness of the dielectric material defining the interplate gap (dielectric thickness), and the dielectric constant of the casing material within the gap. In many electronic circuit applications, particularly in aerospace operating environments, it is desirable to provide a highly compact capacitor construction with a relatively high capacitance. In this regard, multiple layer capacitors have been developed with two groups of conductive plates of opposite polarity arranged alternately in a stack and encased within the selected dielectric casing material, with the multiple plates providing a significantly increased active plate surface area with a relatively small overall increase in capacitor size. See, for example, U.S. Pat. Nos. 3,235,939 and 3,456,313.

In the past, ceramic dielectric capacitors have been produced by formulating the selected dielectric material such as a barium titanate or the like into relatively thin sheets. While in a relatively flexible "green" state before firing, the ceramic sheets are electroded or silk-screened with a refractory metal to define thin conductive plates of selected area. A plurality of these ceramic sheets with conductive plates thereon are laminated into a stack and then fired to form the sheet into a rigid and dense, substantially monolithic casing structure having the conductive plates encased therein at a predetermined dielectric thickness. The conductive plates are shaped to provide thin edges exposed at the exterior of the casing for connection to appropriate conductive leads as by soldering or the like. In multiple plate capacitors, groups of the plate edges are appropriately coupled to each other by conductive metallization strips applied to the exterior of the casing, with the conductive leads being fastened to the metallization strips by soldering or the like.

A variety of problems and disadvantages have been encountered in the use of ceramic dielectric or monolithic capacitors of the general type described above. More specifically, the externally exposed edges of the encased conductive plates define entry sites along so-called knit line defects for ingress of moisture between the conductive plates and adjacent dielectric material. Such moisture ingress contributes to internal dendritic growth or increased ionic mobility which causes corresponding reductions in insulation resistance between adjacent conductive plates, which can lead to parametric or catastrophic failure. Moreover, thermal cycles encountered during normal capacitor operation can cause repeated vaporization and recondensing of minute moistures quantities, resulting in cracking and failure of the ceramic dielectric material. Still further, in a conventional ceramic capacitor, the externally formed solder joints used to connect the conductive leads sometimes provide inadequate mechanical lead pull strength especially at elevated operating temperatures. The external solder joints are also esthetically unacceptable and/or require insulation coverings for some circuit applications.

In the past, the problems of moisture penetration have been addressed primarily by encapsulating the entire monolithic casing within a jacket or coating of a suitable insulating material, such as an epoxy, potting compound, polymeric coating, etc. This jacket or coating is intended to seal the casing against moisture penetration, while simultaneously covering solder joints to enhance the appearance of the capacitor. Advantageously, the outer jacket additionally provides mechanical support for the conductive leads to increase the lead pull strength. However, the outer insulation jacket inherently increases the overall size and shape of the resultant capacitor, resulting in a failure to optimize the capacitance per unit volume, sometimes referred to as volumetric efficiency. Moreover, while the jacket provides some resistance to moisture penetration, moisture ingress may nevertheless occur by penetration between the jacket and the conductive leads, or by gradual migration directly through the jacket in accordance with the bulk permeability of the jacket material. Alternately, different thermal coefficients of expansion for the jacket and casing can result in moisture laden air being sucked in by the jacket when significant thermal cycles are encountered. When such moisture penetration occurs, delamination of the jacket from the ceramic casing often results in reduced insulation resistance, or short circuiting high voltage corona between the casing and the jacket. The differential thermal coefficients can also cause cracking failure of the ceramic casing as the jacket and casing expand and contract at different rates in response to high temperatures or thermal cycling operation. Attempts to minimize risk of such cracking failure have focused upon the use of resilient jacket materials which, unfortunately, do not provide acceptable mechanical support for the conductive leads.

Encapsulated monolithic casing capacitors are also limited to environments of use wherein outgassing of solvents and other volatiles can be tolerated. That is, encapsulating materials exhibit outgassing characteristics in varying degrees, wherein a gradual mass loss over a period of time is encountered as solvents and/or other condensable volatiles are outgassed to the surrounding environment. Such outgassing is unacceptable in some capacitor applications, such as in space and other sensitive environments.

There exists, therefore, a significant need for improvements in ceramic dielectric capacitors, particularly with respect to providing enhanced resistance to moisture penetration without the use of a conventional encapsulating outer jacket. Moreover, there exists a need for such improvements in a capacitor designed for substantially optimized volumetric efficiency and relatively high lead pull strength. The present invention fulfills these needs and provides further related advantages.

SUMMARY OF THE INVENTION

In accordance with the invention, a novel ceramic cased capacitor and related method of construction are provided, wherein the capacitor is substantially impervious to moisture penetration and provides a high lead pull strength capable of operation at relatively high temperatures. The capacitor includes at least two conductive plates encased at a selected gap within a monolithic casing of a selected dielectric material. Conductive leads are attached by soldering lead ends within shallow recessed seats formed in the casing, with each seat being lined partially by the conductive plate or plates to be coupled to the associated lead. This recessed seat mounting arrangement provides an attractive and mechanically superior lead attachment site without the use of an encapsulating insulative jacket or coating, whereby moisture penetration problems associated with such jackets or coatings can be avoided.

In a preferred form of the invention, a multiple layer ceramic capacitor is formed by applying the conductive plates of a refractory metal individually as thin layers onto a plurality of ceramic sheets in an unfired, green state. The conductive plates are defined by two sets of plates of different polarities, and the ceramic sheets are arranged in a stack with the two plates in alternate sequence. The conductive plates are formed with their outer marginal edges disposed inboard relative to outer edges of the ceramic sheets. One or more ceramic base and cover sheets are placed at the top and bottom of the stack. The assembled stack is then laminated by appropriate heat and pressure and then fired to form the ceramic sheets into a densified substantially monolithic core or casing having the conductive plates encased therein in parallel with interplate dielectric thickness of predetermined size.

The two sets of conductive plates are shaped to define outwardly projecting tabs disposed for connection to the conductive leads. More particularly, the first plates include vertically aligned tabs which extend beyond adjacent margins of the second plates, and vice versa. The recessed seats for mounting of the conductive leads are formed as shallow counterbores bridging respectively into the aligned edges of the tabs on the first and second plates. In a preferred process, the recessed seats are drilled subsequent to lamination of the stack but prior to densification firing. These recessed seats are lined with an appropriate conductive glass frit material, which is fired in place. The lead ends are then anchored as by soldering within the recessed seats in electrical contact with the first and second plate groups, respectively. The resultant capacitor provides superior lead pull strength and lead attachment appearance without requiring an outer insulation jacket or coating, and wherein the attachment site of the leads to the casing is substantially impervious to moisture penetration. The omission of the encapsulation jacket beneficially permits the capacitor to be used at relatively high operating temperatures, relatively high voltages, and/or subjected to significant thermal cycling with reduced risk of failure.

In operational use, the first and second groups of the conductive plates are connected via the leads for opposite polarity. In one form of the invention, the groups of first and second plates are formed for attachment of the conductive leads at a common side of the ceramic casing, thereby providing a so-called radial capacitor geometry. In another form, the plates are configured for lead attachment at opposite ends of the casing to provide a so-called axial capacitor geometry.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 3 is an exploded perspective view of the ceramic cased capacitor;

FIG. 5 is an enlarged fragmented sectional view illustrating one of the recessed seats formed in the ceramic casing;

FIG. 6 is fragmented sectional view similar to FIG. 5 and depicting application of a glass frit material to the surfaces of the recessed seat;

FIG. 7 is a fragmented sectional view similar to FIG. 6 and showing firing of the glass frit material;

FIG. 8 is a fragmented sectional view similar to FIG. 7 but illustrating solder attachment of a conductive lead within the recessed seat; and FIG. 9 is a perspective view similar to FIG. 1 but illustrating an axially leaded monolithic cased capacitor embodying one alternative preferred form of the invention.

DETAILED DESCRIPTION OF THE PREFERRED EMBODIMENTS

Figure 1:
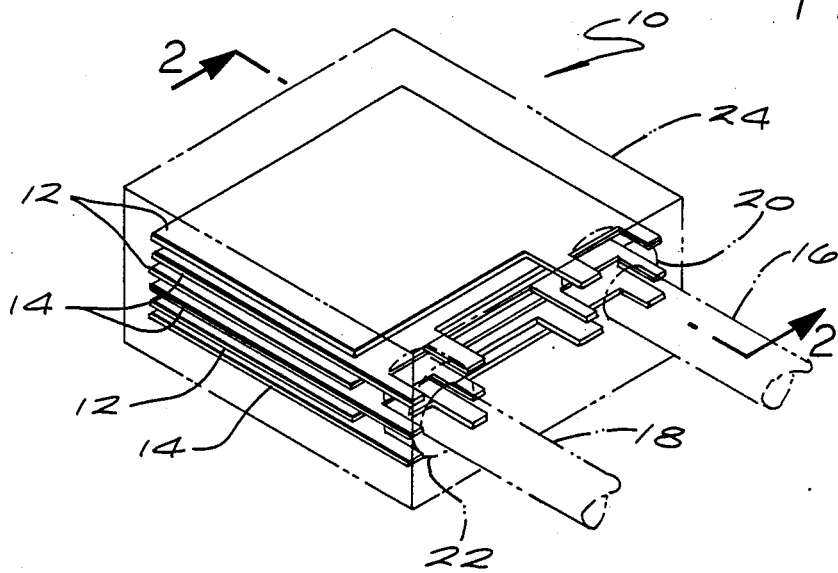
FIG. 1 is a perspective view illustrating a radial leaded monolithic ceramic cased capacitor embodying the novel features of the invention.

As shown in the exemplary drawings, a novel ceramic cased capacitor referred to generally in FIG. 1 by the reference numeral 10 is designed for secure electrical and mechanical attachment of a plurality of encased conductive plates 12 and 14 of opposite polarity to a pair of conductive leads 16 and 18, respectively. The ends of the conductive leads 16 and 18 are anchored within recessed seats 20 and 22 formed in a substantially monolithic core or casing 24, and in a manner such that the capacitor is substantially impervious to moisture penetration.

The ceramic cased capacitor 10 of the present invention is constructed in a manner providing a substantially optimized volumetric efficiency, namely high charge storing capacity in a highly compact, space efficient size and shape. The invention provides an apparatus and method for securely anchoring conductive leads in electrical communication with the conductive plates 12 and 14 while safeguarding against undesired moisture penetration which can cause premature capacitor failure. The leads are attached to the capacitor casing 24 in a manner providing superior lead pull strength without addition of a conventional outer insulating jacket or coating formed from an epoxy or potting compound, polymeric material, etc. As a result, the capacitor formed in accordance with the invention can be operated at high operating temperatures such as at 260° C. (about 550° F.) and higher without significant risk of temperature induced failure or disconnection of the conductive leads. The omission of the conventional encapsulating outer jacket improves overall longevity and reliability by eliminating jacket-associated failures such as delamination of the jacket from the casing, high voltage corona between the jacket and casing, differential thermal coefficients of expansion with respect to the jacket and casing, reductions in insulation resistance due to moisture penetration, and/or dendritic growth.

As shown in FIGS. 1-5, the ceramic cased capacitor 10 comprises at least one conductive plate 12 and at least one conductive plate 14 encased in spaced parallel relation within the ceramic casing 24. The illustrative drawings depict a preferred multiple layer capacitor having multiple plates 12 and a corresponding number of the plates 14 arranged within the ceramic casing 24 in an alternating stack. For example, FIGS. 1-5 specifically show three of the conductive plates 12 interleaved in spaced relation with three of the conductive plates 14. As will be described, the sets of conductive plates 12 and 14 are electrically connected, respectively, to the conductive leads 16 and 18 of opposite polarity which are adapted in turn for connection to a voltage source of an electric circuit (not shown). In use, the sets of plates 12 and 14 function to store an electrical charge, with the charge storing capacitance (in farads) being a function of the overlapping (active) plate areas, the dimensions of the gaps between the plates, and the dielectric constant of the casing material disposed within the interplate dielectric thickness.

The capacitor 10 is constructed by formation of the conductive plates 12 and 14 upon a plurality of casing material sheets 26, as viewed best in FIG. 3. These casing sheets 26 are formulated to have a selected dielectric constant, with a ceramic material such as barium titanate being commonly used. The precise material formulation is adjusted as is well known in the art to provide a particular selected high to low dielectric constant. The thus-constructed sheets 26 are then processed preferably in a flexible green or unfired state to apply the conductive electrode plates 12 and 14 thereon. As is known in the art, these plates 12 and 14 are normally applied as metallized films using printing or electroding techniques wherein conductive inks containing an appropriate refractory metal or metals are applied. In a preferred form, the plates 12 and 14 are applied as lattices to permit improved bonding of the casing sheets 26 during subsequent processing. Importantly, the marginal edges of the conductive plates 12 and 14 are spaced inboard from the marginal edges of the sheets 26.

Figure 2:
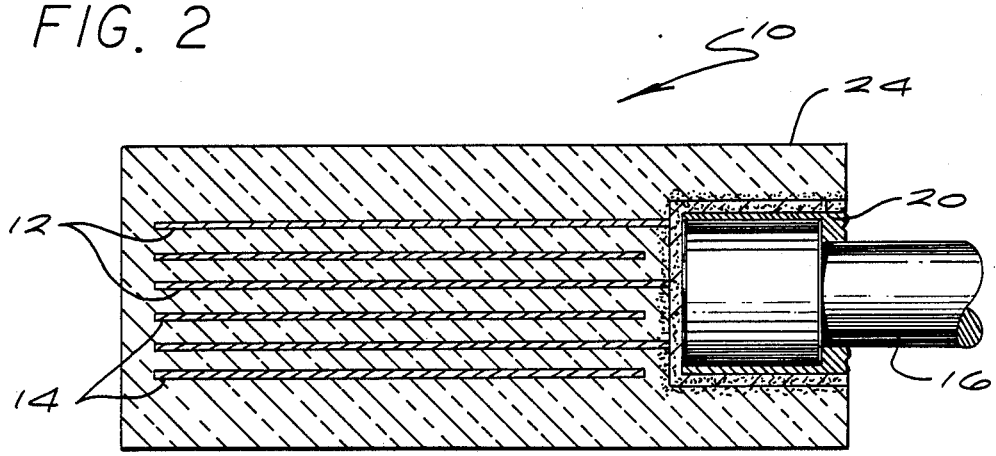
FIG. 2 is an enlarged longitudinal vertical sectional view taken generally on the line 2—2 of FIG. 1.
Figure 4:
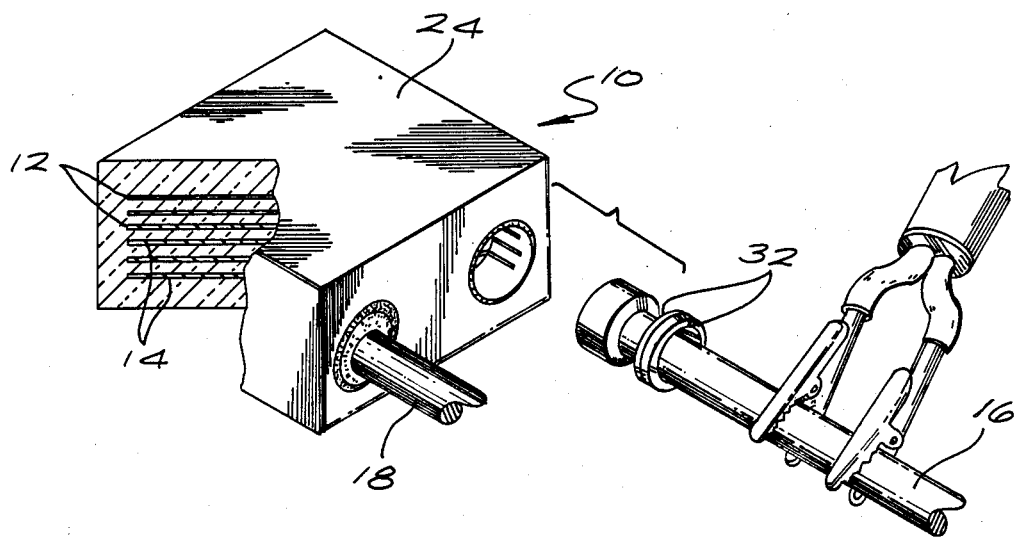
FIG. 4 is a perspective view similar to FIG. 1 and illustrating a monolithic ceramic casing with encased conductive plates, and including recessed seats for secure attachment of conductive leads.

The casing sheets 26 are assembled in a stack (FIG. 3) with the conductive plates 12 and 14 arranged in alternating sequence. Lower and upper base and cover sheets 27 are assembled below and above the sheets 26 to provide added material thickness, wherein the cover sheets 27 do not carry conductive plates thereon. The assembled stack is then laminated under appropriate heat and pressure, volatiles are eliminated in the course of a conventional binder bake-out step, and thereafter the stack is subjected to a conventional sintering or densification firing step to fire the sheets and form the substantially monolithic casing 24 (FIGS. 2 and 4). Within this rigid and densified monolithic casing 24, the conductive plates 12 and 14 are suspended in fixed parallel relation with interplate dielectric thicknesses of predetermined dimension.

The conductive plates 12 and 14 are shaped to define outwardly projecting tabs for connection electrically and mechanically to the conductive leads. More specifically, the conductive plates 12 are identically shaped to define short tabs 28 which are generally vertically aligned with each other and protrude outwardly relative to adjacent margins of the other plates 14. Similarly, the conductive plates 14 include a generally vertically aligned set of short tabs 30 extending outwardly relative to adjacent margins of the plates 12. FIG. 3 illustrates the formation of these tabs 28 and 30 to terminate inboard relative to the outermost margins of the casing 24. Moreover, FIG. 3 illustrates these sets of tabs 28 and 30 extending outwardly from their respective plates in laterally spaced relation at a common side of the casing.

Subsequent to formation of the laminated casing 24, the pair of recessed seats 20 and 22 are formed to protrude inwardly from the exterior surface or envelope of the casing. As shown in the illustrative drawings, these recessed seats 20 and 22 comprise a pair of shallow round counterbores formed by drilling or the like to bridge short distances, respectively, into the edges of the aligned groups of tabs 28 and 30. In a preferred process, the counterbores are drilled after lamination of the stack of sheets 26 and 27, but prior to final densification firing. Alternatively, the counterbores can be formed by ultrasonic drilling or the like subsequent to densification firing. As shown in FIGS. 4 and 5, the resultant recessed seats 20 and 22 expose edges of the conductive layers 12 and 14 within a limited region lining interior surfaces of the seats. The diametric sizes of the seats are chosen for relatively close reception of the conductive leads 16 and 18, as will be described, and to permit substantial exposure of each tab of the associated set of conductive plates.

Preparatory to lead installation, and subsequent to firing of the casing 24, the recessed seats 20 and 22 are lined with a selected conductive frit material applied typically in paste form, as viewed in FIG. 6. Although the precise formulation of the frit material may vary, a silver or palladium-silver glass powder composition in paste carrier is preferred. The silver component provides high quality conductive coupling to the conductive layers exposed within the recess 20 or 22, whereas the glass component bonds well with the adjacent surfaces of the ceramic casing 24 in a manner providing substantial imperviousness to moisture penetration. Such bonding of the glass material to the interior surfaces of the recesses is obtained by subjecting the casing and frit material (FIG. 7) to appropriate heat within a furnace, sometimes referred to as a silver kiln. This heating step, typically at a temperature of about 750°-800° C. (about 1380°-1440° F.) causes the glass material to glaze and at least partially penetrate the surrounding ceramic material for excellent bond therewith. The actual thickness of a resultant glazed frit layer 34 is relatively thin, but is shown in exaggerated thickness in the accompanying drawing for purposes of clarity.

The ends of the conductive leads 16 and 18 are then seated and soldered into the recessed seats 20 and 22, with the frit material and addition of sufficient solder providing a conductive yet hermetically sealed connection with the casing. As shown in FIGS. 2, 4 and 8, a preferred end geometry for the conductive leads 16 and 18 comprises a Dumet style configuration wherein a conductive lead of copper clad nickel or the like includes a slightly enlarged, cylindrical and coaxially formed head 33 at the end thereof. The lead head 33 is sized diametrically to fit closely but with at least some tolerance into the associated recessed seat 20 or 22 to permit at least some thermal size variation without pulling loose or unduly stressing the ceramic casing 24. For example, an approximate diametric difference between the recessed seat and the lead head 33 of about 5–10 mils is sufficient for most applications.

In a preferred solder process, the conductive leads are manipulated and soldered in place using resistance tweezers 36, such as the resistance tweezers marketed by American Electrical Heater Company of Detroit, Mich. under the name American Beauty, and model nos. 105-83 (power unit), 105-41 (tweezers), and 105-19 (foot switch). The tweezers 36 are used to grab the conductive lead near the lead head 33, as shown with respect to the lead 16 in FIGS. 2 and 8. The supported lead head 33 is inserted fully into the associated recessed seat 20 and appropriately energized to reflow one or more ring-shaped solder preforms 32 placed onto the lead 16 immediately behind the head 33. As shown in FIG. 8, this step is carried out with the recessed seat 20 presented upwardly, such that the melted solder preforms 32 flow down about and substantially fill the annular gap between the head 33 and the frit layer 34. This soldering process is advantageously facilitated by preheating of the capacitor and the lead to a point close to the solder reflow temperature, whereby minimal additional heat and/or time is required by operation of the resistance tweezers 36. Moreover, soldering is further facilitated by preliminarily dipping the lead head 33 in an appropriate flux bath and then into a molten solder bath before placement into the recessed seat. The assembled capacitor and leads are then cooled in a controlled manner to avoid undue thermal stress.

The resultant ceramic cased capacitor 10 thus supports the conductive leads 16 and 18 in a secure and stable manner, and with attractive and clean solder joints. The recessed mounting of the leads at positions buried within the envelope of the capacitor casing 24 provides extended cylindrical surface areas for attachment to the leads yielding a high lead pull strength sufficient to permit the leads to be manipulated, bent, etc., as required for capacitor installation and operation even at high temperatures without significant risk of the leads pulling loose. Standard epoxy coatings and the like used conventionally with ceramic cased capacitors can be omitted, due to the substantially impervious nature of the casing 24 and the hermetically sealed lead attachment sites of extended surface areas. This construction beneficially permits the capacitor to omit entirely the conventional prior art outer coating, resulting in a smaller overall size and shape for greater volumetric efficiency and prolonged operational life with enhanced performance characteristics. This omission of the traditional outer coating further permits facilitated capacitor mounting, for example, by direct attachment of the ceramic casing to a supporting substrate. Moreover, the capacitor can be used at high operating temperature, or be subjected to repeated thermal cycling without failure. Furthermore, outgassing from a conventional outer jacket or degradation of a conventional outer jacket under hostile environmental condition are avoided.

The novel ceramic cased capacitor formed according to the invention may be constructed in a variety of different geometric configurations to suit different operating requirements. For example, FIGS. 1-8 show the conductive leads 16 and 18 extending from a common side edge of the casing 24, thereby providing a so-called radial capacitor geometry. Alternately, as viewed in FIG. 9, a similarly constructed capacitor 10' may include sets of conductive plates 12' and 14' connected to conductive leads 16' and 18' extending outwardly from opposite ends of a ceramic casing 24', thereby defining a so-called axial capacitor geometry.

Various additional modifications and improvements to the ceramic cased capacitor of the present invention will be apparent to those skilled in the art. For example, alternative lead attachment techniques can be used, such as plated terminations, nickel barrier terminations, gold terminations, etc. Further, appropriate leads such as silver-based materials or the like can be attached without soldering by the use of silver paste and application of sufficient heat in a silver kiln. Further, alternative recess geometries may be utilized, if desired. Accordingly, no limitation on the invention is intended by way of the foregoing description and the accompanying drawings, except as set forth in the appended claims.

What is claimed is:

1. A capacitor, comprising:
   a pair of conductive plates;
   a substantially monolithic casing of dielectric material having said pair of conductive plates encased therein in spaced parallel relation, said casing having an exterior surface, and a pair of recessed seats extending into said casing from said exterior surface with sufficient depth for respectively exposing edges of said conductive plates only within said seats;
   a pair of conductive leads; and
   means for anchoring ends of said conductive leads respectively within said recessed seats, said anchoring means being substantially impervious to moisture penetration;
   said anchoring means including a conductive frit material lining the surfaces of said casing within said seats, and a selected solder for connecting said leads end first to said frit material.

2. The capacitor of claim 1 wherein said casing comprises a ceramic casing.

3. The capacitor of claim 1 wherein said pair of conductive plates are encased within said casing with substantial portions of said plates in overlying spaced relation, one of said plates having a tab projecting beyond an adjacent side margin of the other of said plates, and said other of said plates having a tab projecting beyond an adjacent side margin of said one plate, said tabs having edges exposed respectively within said recessed seats.

4. The capacitor of claim 1 wherein said pair of conductive plates comprises first and second groups of conductive plates encased within said casing in an alternating stacked sequence in spaced relation.

5. The capacitor of claim 1 wherein said exterior surface of said casing is unencapsulated.

6. The capacitor of claim 1 wherein said recessed seats are round counterbores formed in said casing to extend inwardly relative to said exterior surface.

7. The capacitor of claim 1 wherein said casing comprises a stack of ceramic sheets supporting and encasing said conductive plates.

8. A capacitor, comprising:
   a group of first conductive plates;
   a group of second conductive plates;

a substantially monolithic casing of dielectric material having said first and second conductive plates encased therein in generally overlying spaced alignment and in an alternating stacked sequence;

said first conductive plates each having a first tab projecting outwardly beyond an adjacent side margin of said second plates, said first tabs being oriented generally in alignment with each other;

said second conductive plates each having a second tab projecting outwardly beyond an adjacent side margin of said first plates, said second tabs being oriented generally in alignment with each other;

said casing defining an exterior surface, and a pair of recessed seats extending into said casing from said exterior surface sufficiently for respectively exposing edges of said first tabs and said second tabs, said first and second tabs being exposed only within said seats;

a pair of conductive leads; and means for anchoring ends of said conductive leads respectively within said recessed seats, said anchoring means being substantially impervious to moisture penetration;

said anchoring means including a conductive frit material lining the surfaces of said casing within said seats, and a selected solder for connecting said leads end first to said frit material.

9. The capacitor of claim 8 wherein said casing comprises a ceramic casing.

10. The capacitor of claim 8 wherein said exterior surface of said casing is unencapsulated.

11. The capacitor of claim 8 wherein said casing comprises a stack of ceramic sheets supporting and encasing said conductive plates.

12. A capacitor construction method, comprising the steps of:

encasing a plurality of at least two conductive plates in generally overlying relation within a casing of a dielectric material;

forming a pair of recessed seats in the casing to extend sufficiently into the casing for respectively exposing edges of the plates within the seats; and connecting a pair of conductive leads to the plates by anchoring the leads end first respectively within the recessed seats, said connecting step including substantially sealing the recessed seats against moisture penetration;

said connecting step including the steps of lining surfaces of the seats formed in the casing with a conductive frit material adapted to bond with the casing, and then soldering the leads end first into the seats.

13. The method of claim 12 wherein said seat forming step comprises forming shallow counterbores in the casing.

14. The method of claim 13 wherein said seat forming step comprises drilling.

15. The method of claim 12 wherein said encasing step comprises encasing the plates in a ceramic material.

16. The method of claim 12 wherein said encasing step comprises encasing the plates in a substantially monolithic, uncoated dielectric material.

17. The method of claim 12 wherein said encasing step comprises encasing a plurality of first plates and a plurality of second plates within said casing is spaced relation and in an alternating stacked sequence.

18. The method of claim 17 wherein said first plates each have a first tab, and wherein said second plates each have a second tab, said encasing step including arranging said first tabs generally in alignment with each other and projecting beyond an adjacent side margin of said the second plates, and arranging said second tabs generally in alignment with each other and projecting beyond an adjacent side margin of the first plates, said seat forming step including forming first and second recessed seats bridging respectively into said first and second tabs.

19. The method of claim 12 wherein said soldering step includes tweezers for supporting the leads and reflowing solder within the recessed seats.

20. A capacitor formed in accordance with the process of claim 12.

21. A capacitor construction method, comprising the steps of:

encasing a plurality of at least two conductive plates in generally overlying relation within a substantially monolithic casing of a dielectric material;

forming a pair of recessed seats in the casing to extend sufficiently into the casing for respectively exposing edges of the plates only within the surfaces of the casing defining the seats;

lining the surfaces of the casing disposed within the seats with a conductive frit material adapted to bond with the casing;

preheating the casing to a temperature level slightly less than the reflow temperature of a selected solder;

inserting a pair of conductive leads end first respectively into the seats;

reflowing the selected solder within the seats; and cooling the casing with the leads attached thereto to solidify the solder and anchor the leads within the seats.

22. A capacitor formed in accordance with the process of claim 21.

23. The method of claim 21 wherein said lead inserting and solder reflowing steps for each of the seats comprises orienting the casing with a selected one of the seats presented upwardly, mounting at least one solder preform onto the lead associated with the selected seat, inserting said associated lead end first into the selected seat, and applying heat to said associated lead for a relatively short time interval to reflow the solder preform to substantially fill the selected seat about the end of said associated lead.

24. The method of claim 23 wherein said heat applying step includes applying heat to the associated lead with resistance tweezers.

25. The method of claim 23 wherein said cooling step is enhanced by said associated lead which provides a thermal path for best flow from the selected solder during said cooling step.

26. The method of claim 21 wherein said lining step comprises coating the surfaces of the casing within the seats with the frit material and then firing the frit material in place.

* * * * *